M. I. HAULTER.
CUSHION WHEEL AND TIRE.
APPLICATION FILED MAY 9, 1917.
1,299,722.
Patented Apr. 8, 1919.
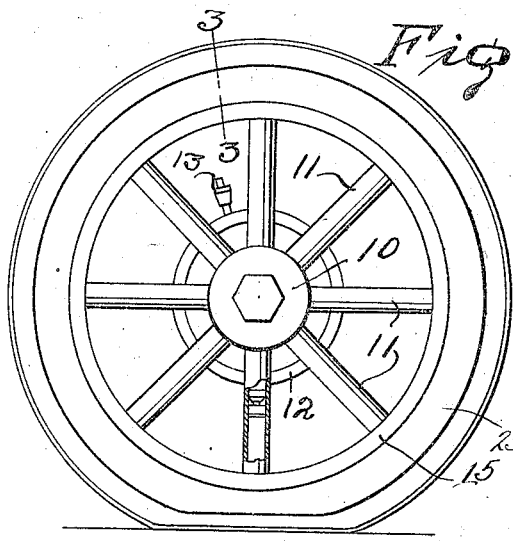
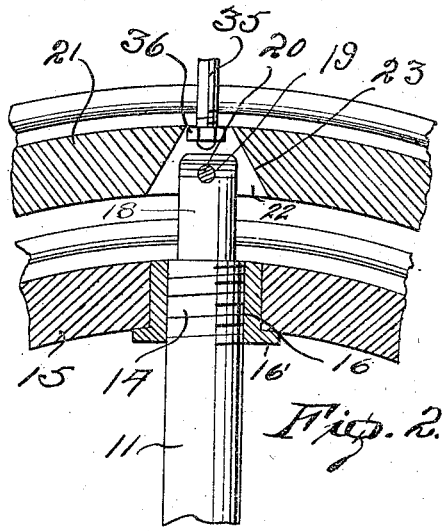
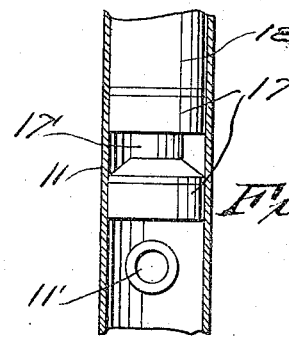
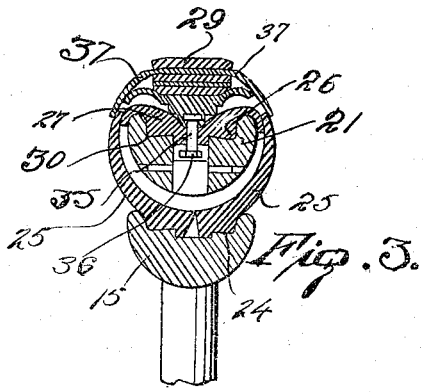
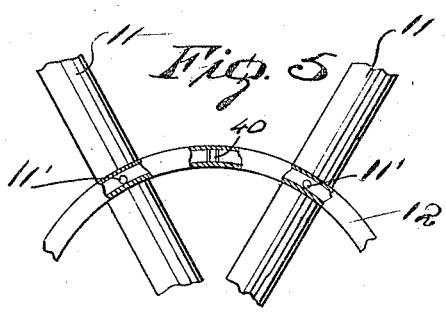
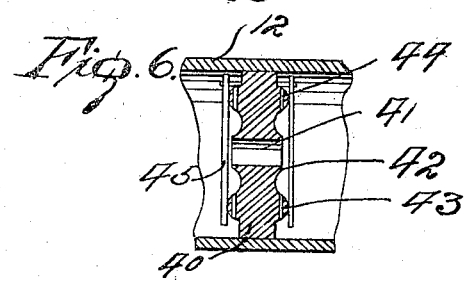
Inventor
M. I. Haulter

UNITED STATES PATENT OFFICE.

MERL I. HAULTER, OF SHIPPENSBURG, PENNSYLVANIA.

CUSHION WHEEL AND TIRE.

1,299,722. Specification of Letters Patent. Patented Apr. 8, 1919.

Application filed May 9, 1917. Serial No. 167,615.

*To all whom it may concern:*

Be it known that I, MERL I. HAULTER, a citizen of the United States, residing at Shippensburg, in the county of Cumberland, State of Pennsylvania, have invented certain new and useful Improvements in Cushion Wheels and Tires; and I do hereby declare the following to be a full, clear, and exact description of the invention, such as will enable others skilled in the art to which it appertains to make and use the same.

The present invention relates to new and useful improvements in cushion wheels for vehicles, and has for its primary object to provide a device of this character in which the load of the vehicle is supported by cylinders in which air is contained under pressure.

Referring to the drawings,

Figure 1, is a side elevation of a wheel constructed in accordance with the present invention, with one of the spokes in section to show its operation, Fig. 2 is an enlarged fragmentary longitudinal sectional view through the tire structure showing in detail one of the piston rods connected with the shoe.

Fig. 3, is a sectional view on the line 3—3 of Fig. 1,

Fig. 4, is a detail view showing the pump piston, and a portion of one of the cylinders, Fig. 5, is a detail sectional view, Fig. 6, is a detail sectional view of one of the valves.

Referring more particularly to the drawings, the reference character 10 designates the hub of the wheel, and extending radially therefrom at equidistantly spaced points throughout its periphery are a plurality of cylinders 11. These cylinders are connected by a continuous circular pipe 12 from which branches a valve 13, which latter is employed for the introduction of air into the several cylinders 11 to the pressure desired by the operator, it being understood that the pipe 12 is in communication with each of the cylinders 11 as at 11′.

The outer end of each of the cylinders is screw threaded, as at 14, and seated in recesses in the rim 15, are tubular members 16, which are provided with internal screw threads with which the screw threads 14 of the cylinders 11 engage to secure the outer ends thereof in place.

Each of the cylinders is provided with a pair of spaced piston heads 17, which are connected to a piston rod 18, the body portion of which is of substantially the same diameter as the inner diameter of the cylinders 11, the end however between the pistons 17, being reduced as at 17′. The outer end of each of the piston rods 18, is preferably flattened and provided with a perforation 19, and pivotally connected to the said flattened end of the piston rod 18 by means of a pin or the like 20, is a shoe 21. The shoe 21 is provided with a recess 22 within which the flattened end of the piston is pivoted, the opposite end walls of the recesses 22 being inclined as at 23 to permit of said shoe 21 freely rocking on the pin 20.

The rim 15 of the wheel in its outer periphery is formed with a seat 24 in which are suitably secured the sections 25 of a divided tire member. The shoe 21 is provided in its outer face with a groove 30 which is adapted to receive the bead 26 of an annulus 27 which has the side edges thereof turned over the shoe 21 to be overlapped by the sections 25 of the divided tire member. Projecting through the annulus 27 are pins each in the form of a bolt 35 the head of which is adapted to be embedded in the tread member 29 while the nut 36 upon the bolt secures the same to the shoe. The tread member 29 is formed with side edge aprons 37 which overlap the adjacent edges of the sections 25 of the divided tire member to prevent dust and dirt from gaining entrance interiorly of the tire member.

Referring to Figs. 5 and 6 it will be seen that the circular pipe 12 is provided between each of the cylinders 11 with a double valve 40, said valve comprising a disk which is provided with a central passage 41, and surrounding said passage 41 on each face of the disk are two concentrically arranged valve seats 42 and 43. The valve seats 43 are provided with bleed openings 44 which permit of the passage of air from one side of the valve to the other, the valve member 45 being retained out of contact with the valve seat 42 owing to the equalization of pressure on opposite sides of the valve member 40.

In operation, it is apparent that as the shoes 21 successively come to the position between the road and the hub of the wheel, the piston 17 will be moved longitudinally of the cylinders 11 against the pressure of the air contained therein, thus cushioning the hub of the wheel and the load supported by the wheel. As the wheel continues to turn, it will be seen that the load is thrown successively on the different cylinders as they come to position between the hub and the road surface.

If from any cause, one of the cylinders 11 or the pipe 12 should become punctured or broken, it will be cut off from communication with broken cylinders by means of the valve 40 in the pipe 12, the valve being placed therein in any suitable manner. By reference to Fig. 6 it would be seen that if the puncture were to occur to the left of the valve, in said figure, the decreased pressure on the same would immediately cause the flexible valve member 45 to the right to engage the central seat 42 thus cutting off the communication between right and left sides of the valve.

Having thus described the invention what is claimed is:

In a resilient wheel having a solid hub, hollow spokes and a rim supported thereby, a tire carried by the rim and having a flexible unbroken annular member therein, a piston mounted in each of the hollow spokes and having a rod connected with the member, an annular hollow tube carried by the spokes concentrically exteriorly of the hub and communicating with said spokes, an air inlet nipple on said tube, a tread on the tire and arranged concentrically of the flexible member, and valves located within the tube at points intermediate of the spokes.

In testimony whereof, I affix my signature in the presence of two witnesses.

MERL I. HAULTER.

Witnesses:
 HARRY MCELHEE,
 GEORGE MILES.

Copies of this patent may be obtained for five cents each, by addressing the "Commissioner of Patents, Washington, D. C."